United States Patent [19]
Rozman

[11] Patent Number: 5,956,245
[45] Date of Patent: *Sep. 21, 1999

[54] CIRCUIT AND METHOD FOR CONTROLLING A SYNCHRONOUS RECTIFIER CONVERTER

[75] Inventor: Allen Frank Rozman, Richardson, Tex.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,502

[22] Filed: Jul. 2, 1997

Related U.S. Application Data

[63] Continuation of application No. 08/887,502, Jul. 2, 1997, which is a continuation of application No. 08/434,712, May 4, 1995.

[51] Int. Cl.[6] .............................. H02M 5/42; H02M 7/00; H02M 7/217
[52] U.S. Cl. ............................... 363/89; 363/127; 363/71
[58] Field of Search ............................. 363/127, 89, 20, 363/21, 53, 71, 65, 97, 81, 84; 323/239

[56] References Cited

U.S. PATENT DOCUMENTS

| | | | |
|---|---|---|---|
| 4,371,919 | 2/1983 | Andrews et al. | 363/65 |
| 4,716,514 | 12/1987 | Patel | 363/127 |
| 4,870,555 | 9/1989 | White | 363/21 |
| 4,922,404 | 5/1990 | Ludwig et al. | 363/89 |
| 5,038,266 | 8/1991 | Callen et al. | 363/89 |
| 5,128,603 | 7/1992 | Wolfel | 323/282 |
| 5,138,249 | 8/1992 | Capel | 323/283 |
| 5,144,547 | 9/1992 | Masamoto | 363/127 |
| 5,179,512 | 1/1993 | Fisher et al. | 363/127 |
| 5,255,174 | 10/1993 | Murugan | 363/17 |
| 5,267,135 | 11/1993 | Tezuka et al. | 363/49 |
| 5,282,123 | 1/1994 | Boylan et al. | 363/21 |
| 5,303,138 | 4/1994 | Rozman | 363/89 |
| 5,396,412 | 3/1995 | Barlage | 363/89 |
| 5,430,640 | 7/1995 | Lee | 363/127 |
| 5,457,624 | 10/1995 | Hastings | 363/127 |
| 5,528,480 | 6/1996 | Kikinis et al. | 363/15 |
| 5,530,635 | 6/1996 | Yashiro | 363/65 |
| 5,532,914 | 7/1996 | Kageyama et al. | 363/50 |
| 5,625,541 | 4/1997 | Rozman | 363/21 |
| 5,636,116 | 6/1997 | Milavec et al. | 363/89 |

FOREIGN PATENT DOCUMENTS

| | | | |
|---|---|---|---|
| 0 396 125 | 5/1990 | European Pat. Off. | H02M 3/335 |
| WO 95/02918 | 1/1995 | WIPO | H02M 7/217 |

OTHER PUBLICATIONS

Article entitled "Improving Power Supply Efficiency with Mosfet Synchronous Rectifiers" by Richard S. Kagan and Min–hwa Chi; disclosed in the Ninth International Solid–State Power Electronics Conference in Jul. 1982 by Power Concepts, Inc.

(List continued on next page.)

*Primary Examiner*—Peter S. Wong
*Assistant Examiner*—Bao Q. Vu

[57] ABSTRACT

A rectifier having an input and an output and a method of controlling the rectifier. The rectifier comprises: (1) switching circuitry coupled between the input and the output, the switching circuitry adapted to operate in selected one of (a) an active bidirectional mode of operation and (b) an inactive unidirectional mode of operation to rectify substantially alternating current at the input to produce substantially direct current at the output and (2) control circuitry coupled between the rectifier output and a control input of the switching circuitry, the control circuitry capable of sensing an output current level of the rectifier and transitioning the switching circuitry between the active bidirectional mode and the inactive unidirectional mode as a function of the output current level thereby to prevent substantial reverse power flow through the rectifier. The rectifier is particularly useful in power systems having a plurality of rectifiers operating in parallel to prevent one rectifier from driving the other.

49 Claims, 5 Drawing Sheets

OTHER PUBLICATIONS

Article entitled "5.6 Mosfets Move In On Low Voltage Rectification" (TA84–2); by M. Alexander, R. Blanchard, R. Severns; MOSPOWER Applications Handbook, Siliconix Technical Article; 1984; Siliconix, Inc.

Article entitled "A Mosfet Resonant Synchronous Rectifier for High–Frequency DC/DC Converters" by W. Tabisz, F. Lee, D. Chen: PESC 1990 Proceedings.

Article entitled "A Simple and Efficient Synchronous Rectifier for Forward DC—DC Converters" by N. Murakami, H. Namiki, K. Sakakibara, T. Yachi; APEC 1993 Proceedings.

Article entitled "LTC 1149 High Efficiency Synchronous Step–Down Switching Regulators" 1994 Linear Databook, vol. III, Linear Technology Corp.

Article entitled "Designing a High Efficiency DC—DC Converter with the EL7560" by Mike Wong; Application Note #18; Elantec Corp.

Article entitled "UCC1582/2582/3582 High Efficiency Synchronous, Step Down Controller" Product and Applications Handbook 1995–1996, Unitrode Corp.

CIRCUIT AND METHOD FOR CONTROLLING A SYNCHRONOUS RECTIFIER CONVERTER

This application is a continuation of application Ser. No. 08/887,502, filed on Jul. 2, 1997, which is a continuation application Ser. No. 08/434,712 filed on May 4, 1995. The aforementioned applications are herein incorporated by reference.

TECHNICAL FIELD OF THE INVENTION

The present invention is directed, in general, to power conversion circuitry and, more particularly, to a control circuit for operating a power rectifier in both active bidirectional and passive unidirectional modes as a function of output level.

BACKGROUND OF THE INVENTION

Increased power density is a continuing goal of modern power supply design. High power density is particularly crucial in applications wherein the allocated space for the power supply relative to the power output is restricted. In addition to being highly compact, the power supply must also be efficient to limit heat-creating power dissipation. Illustrative applications for a high density power supply include an off-line power supply used to power a laptop computer or a power supply module for a telecommunication system employing an Integrated Services Digital Network ("ISDN").

Bridge-type converters are particularly suitable for such applications, since they may be designed to operate resonantly. Resonance is an operational mode that permits both high power density and efficiency. One example of a bridge-type converter is a half-bridge converter as disclosed in U.S. Pat. No. 5,274,543 to Loftus, issued on Dec. 28, 1993, entitled "Zero-Voltage Switching Power Converter with Lossless Synchronous Rectifier Gate Drive" and incorporated herein by reference. Loftus' converter operates as a forward converter and includes a bridge circuit comprising two power switching transistors to drive a primary transformer.

Loftus discloses a drive arrangement and operative scheme for driving the power transistors, thereby limiting the dissipation losses within the power switching transistors. The drive circuitry drives the power switching transistors with unequal duty cycles having a conducting duration such that the sum of the conduction intervals substantially equals the combined switching period of the power transistors. The conducting intervals are separated by very short dead time intervals controlled by the differing turn-on and turn-off times of the power switching transistor. The short interval between alternate conductions of the power switching transistors is sufficient in duration to allow zero voltage turn-on of the power switching transistors but short enough in duration to minimize power loss and conducted noise.

Another area of concern in a power supply is an additional loss of efficiency realized through the power dissipated in the rectifier circuit of the converter. While a Schottky diode rectifier is approximately 80% efficient, a metal oxide semiconductor field effect transistor ("MOSFET") synchronous rectifier is nearly 90% efficient.

While synchronous rectification is a relatively old concept, it has failed to gain widespread acceptance because of the unavailability of cost-effective, low $R_{DS(on)}$ rectifier devices (those having a small static drain-source resistance while forward-biased). Prior practical implementations have required designers to couple many higher $R_{DS(on)}$ devices in parallel to arrive at a suitably low overall $R_{DS(on)}$. Recent advances in high cell density MOSFET technology, however, have made available MOSFET devices with very low (<10 milliohms) $R_{DS(on)}$ in cost-effective, commercial packages. As a result, synchronous rectification has recently regained widespread interest; companies are beginning to introduce power converters using synchronous rectification into the marketplace.

The normal operating mode for converters operating with forced load-sharing is for each converter to provide an equal portion of the total load current. A control terminal of the converters are coupled together in a star connection, thereby providing the necessary feedback to equalize the load currents actively.

However, it is well known in the industry that synchronous rectifier circuits are capable of processing power bidirectionally, both from the input to the output, and from the output back to the input (of course, provided a voltage or current source externally drives the output). Bidirectional current flow can provide some significant advantages, perhaps the most common of which is elimination of the so-called critical current phenomenon found in buck-derived converters. The bidirectional current flow characteristic allows inductor current in the synchronous rectifier circuit to flow continuously, thereby avoiding a sluggish reaction to a load or transient on the output of the converter circuit.

However, for converters connected in parallel with forced load-sharing, this bi-directional power flow characteristic can result in an undesirable (and possibly damaging) operating mode wherein one converter drives the output of another. With one or more converters operating in this reverse power processing mode, the overall power system can be circulating large amounts of current while actually delivering very little current to the load. This results in high power dissipation during lighter load conditions. Also, the system transient response could be detrimentally affected as the converters transition from the reverse power processing mode to a forward power processing mode.

Parallel (forced load-sharing) circuitry in each converter, responsible for driving the rectifier devices, may not be able to prevent this mode of operation, as the parallel circuit is specifically designed to be effective over a limited range. See U.S. Pat. No. 5,036,452 to Loftus, issued on Jul. 30, 1991, entitled "Current Sharing Control with Limited Output Voltage Range for Paralleled Power Converters," and incorporated herein by reference, for a discussion of load sharing between power circuits connected in parallel to a common load. Therefore, it is beneficial to provide a circuit that prevents reverse power flow in converters configured for parallel operation.

The aforementioned predicament of reverse power flow in converters for parallel operation is the subject of two articles. These articles introduce a circuit wherein the synchronous rectifier control voltage is modified to prevent reverse power flow. The circuits are generally designed either to prevent reverse power flow at converter start-up or to address "hot plug-in" problems encountered when substituting individual converters in a functioning power system.

In the first article, "A Highly Efficient, Low-Profile 300-W Power Pack for Telecommunications Systems," APEC 1994 Proceeding, pp. 786–792, by N. Murakami, I. Yumoto, T. Yachi and K. Maki, a resonant reset forward converter with a novel synchronous rectifier drive circuit is disclosed. The circuit comprises a pair of switches to disable the gate drive of one synchronous field effect transistor ("FET") based on switch current. Another synchronous FET uses an output inductor to generate the drive voltage, and can be configured off when the inductor current goes discontinuous. The idea is to detect when the converter goes into discontinuous conduction mode, and to use this information to disable the synchronous rectifiers, thus preventing a catastrophic failure. The described circuit, which is designed for parallel operation, uses droop regulation to achieve load sharing, rather than active load sharing using a parallel pin connection. The circuit, thus, turns one of the FETs off based on switch current, and the other FET off based on a discontinuous current condition.

While the Murakami et al. circuit attempts to solve the proposed problem it is limited for the following reasons. First, the circuit as described is only compatible with a self-synchronized drive scheme. Moreover, the circuit as described apparently only has a problem when a converter falls below critical inductor current. Both the transformer secondary voltage and the inductor voltage can collapse to zero during discontinuous conduction mode. The output voltage supplied by the paralleled modules could then energize the gates of the synchronous FETs, thus turning them on at the wrong time. Stated another way, the resonant reset topology forces a finite dead time in the gate drive of one synchronous FET, allowing the critical current point to occur. Finally, the circuit as described is limited to a passive droop sharing method, and does not accomplish active load sharing with a feedback sensing current circuit.

In a second reference by N. Murakami, N. Yamashita and T. Yachi, entitled "A Compact, Highly Efficient 50-W On-board Power Supply Module for Telecommunications Systems," APEC 1995 Proceeding, pp. 297–302, a resonant reset forward converter with a novel synchronous rectifier drive circuit is introduced very similar to the circuit described above. The circuit comprises a pair of self synchronized FETs with a control switch in series with each gate. These switches are described as necessary to prevent reverse power flow when connected in parallel with other converters. This circuit suffers from the very same limitations inherent in the circuit described above. Again, the circuits by Murakami et al. prevent reverse power flow by turning the rectifying FET off when the voltage across the output inductor falls to zero (a condition which occurs during discontinuous inductor current mode). This prevents the bus voltage from activating the rectifying FET when the inductor voltage falls to zero. The circuits as described, however, still operate as synchronous rectifiers at all times.

Accordingly, what is needed in the art is a control circuit for operating a power rectifier, the control circuit capable of sensing conditions under which reverse power flow may occur in the rectifier and taking steps to prevent the reverse power flow.

SUMMARY OF THE INVENTION

To address the above-discussed deficiencies of the prior art, the present invention provides a rectifier having an input and an output and a method of controlling the rectifier. The rectifier comprises: (1) switching circuitry coupled between the input and the output, the switching circuitry adapted to operate in selected one of (a) an active bidirectional mode of operation and (b) an inactive unidirectional mode of operation to rectify substantially alternating current at the input to produce substantially direct current at the output and (2) control circuitry coupled between the rectifier output and a control input of the switching circuitry, the control circuitry capable of sensing an output level of the rectifier and transitioning the switching circuitry between the active bidirectional mode and the inactive unidirectional mode as a function of the output current level thereby to prevent substantial reverse power flow through the rectifier.

Thus, the present invention introduces a bi-modal converter having both active and inactive (or passive) modes of operation. In the active mode, the switching circuitry switches to rectify the substantially alternating current, perhaps in resonance to realize the above-described efficiencies of a resonant converter. Bidirectional current flow is possible in the active mode. In the passive mode, the switching circuitry acts as a diode rectifier, allowing only unidirectional current and thereby preventing reverse power flow. The output level of the converter may be determined by measuring voltage, current, power or another suitable characteristic. The rectifier is particularly useful in power systems having a plurality of rectifiers operating in parallel to prevent one rectifier from driving the other.

In a preferred embodiment of the present invention, the switching circuitry comprises MOSFET switches. Alternatively, other switches having a low $R_{DS(on)}$ are suitable for use with the present invention.

In a preferred embodiment of the present invention, the rectifier is coupled in parallel with a second rectifier, the control circuitry substantially preventing the second rectifier from causing the substantial reverse power flow. Thus, the present invention is operable in a power. system comprising multiple rectifiers.

In a preferred embodiment of the present invention, the switching circuitry comprises discrete diodes to allow the switching circuitry to operate in the inactive unidirectional mode. The diodes conduct electricity when the control circuitry deactivates the active switches. As an alternative to discrete diodes, the present invention may employ body diodes integral with the MOSFET active switches.

In a preferred embodiment of the present invention, the control circuitry comprises a sensor for detecting the output level selected from the group consisting of: (a) a current transformer in electrical communication with the output, (b) a shunt resistor coupled in series with the output and (c) a Hall effect current sense device coupled in series with the output. Those of ordinary skill in the art are familiar with other conventional current and non-current sensors and their potential applicability to the rectifier of the present invention.

In a preferred embodiment of the present invention, the control circuit transitions the switching circuitry from the active bidirectional mode to the inactive unidirectional mode when the output level drops below a predetermined threshold level. In a more preferred embodiment, the control circuitry transitions the switching circuitry between the active bidirectional mode and the inactive unidirectional mode when the output current level is between about 5% and about 10% of a full rated output current level. Those of ordinary skill in the art will realize, however, that other output levels or ranges may be more appropriate in other applications.

In a preferred embodiment of the present invention, the rectifier further comprises a self-synchronized drive circuit adapted to provide a drive signal to the switching circuitry for varying a duty cycle of the switching circuitry as a function of the output level (closed loop). Alternatively, the rectifier may be controlled without regard to actual output level (open loop).

In a preferred embodiment of the present invention, the control circuitry comprises comparison circuitry for comparing the output level with a predetermined threshold level.

In a preferred embodiment of the present invention, an active load-sharing circuit is coupled to the rectifier and a second rectifier to effect load sharing therebetween.

In a preferred embodiment of the present invention, the control circuitry is enabled only when the rectifier is coupled in parallel with a second rectifier.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
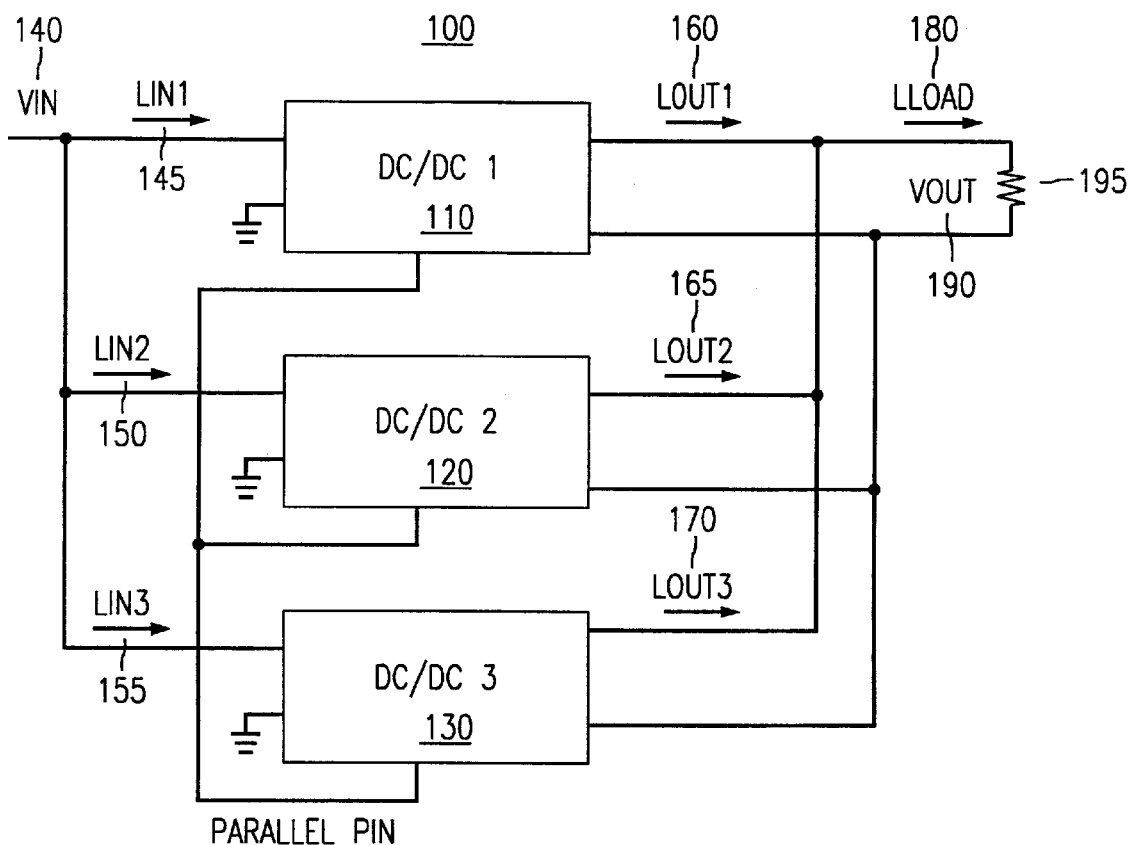
FIG. 1 illustrates a schematic diagram of a plurality of converters operating in a parallel forced load-sharing converter circuit.

Referring initially to FIG. 1, illustrated is a schematic diagram of a plurality of converters operating in a parallel forced load-sharing converter circuit 100. The circuit 100 comprises a first DC/DC converter 110, a second DC/DC converter 120, and a third DC/DC converter 130 configured for parallel operation. The DC/DC converters 110, 120, 130 function by converting a DC input voltage to alternating current (AC) and converting the AC back into a DC output voltage. The DC input voltage, $V_{in}$ 140, is applied across the input of the circuit 100 and an input current, $I_{in1}$ 145, $I_{in2}$ 150, and $I_{in3}$ 155 enters the DC/DC converters 110, 120, 130, respectively. In turn, an output current, $I_{out1}$ 160, $I_{out2}$ 165, and $I_{out3}$ 170, exits each DC/DC converter 110, 120, 130, respectively. A combined load current, $I_{load}$ 180, and DC output voltage, $V_{out}$ 190, is delivered across an output resistive load 195. The normal operating mode for converters operating with forced load-sharing is for each converter to provide an equal proportion of the load current. The parallel pins of the converters are connected together in a star connection, which provides the necessary feedback to actively equalize the load currents.

Figure 2:
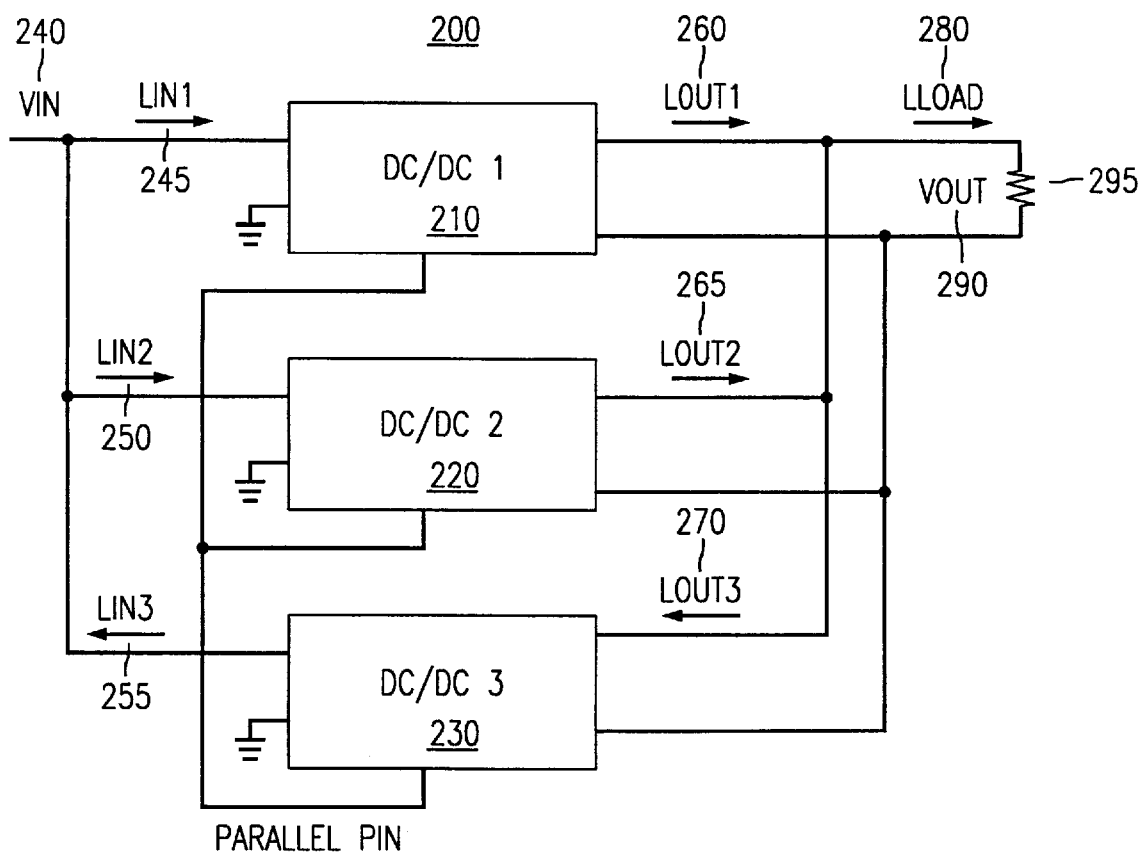
FIG. 2 illustrates a schematic diagram of a plurality of synchronous rectifier converters operating in a parallel forced load-sharing synchronous rectifier converter circuit with one converter processing power in a reverse direction.

Turning now to FIG. 2, illustrated is a schematic diagram of a plurality of synchronous rectifier converters operating in a parallel forced load-sharing synchronous rectifier converter circuit 200 with one converter processing power in a reverse direction. The circuit 200 comprises a first DC/DC synchronous rectifier converter 210, a second DC/DC synchronous rectifier converter 220, and a third DC/DC synchronous rectifier converter 230 configured for parallel operation. A voltage, $V_{in}$ 240, is applied across the input of the circuit 200 and an input current, $I_{in1}$ 245, $I_{in2}$ 250, enters the first and second DC/DC synchronous rectifier converters 210, 220, respectively. However, an input current, $I_{in3}$ 255, is illustrated exiting the third DC/DC synchronous rectifier converter 230. An output current, $L_{out}$ 260, $I_{out2}$ 265, is illustrated exiting the first and second DC/DC synchronous rectifier converters 210, 220, respectively, but an output current $I_{out3}$; 270 enters the third DC/DC synchronous rectifier converter 230 in a reverse direction. A combined load current, $I_{load}$ 280, and output voltage, $V_{out}$ 290, is delivered across an output resistive load 295.

In the illustrated embodiment, the first and second DC/DC synchronous rectifier converters 210, 220, are processing power in a normal, forward direction, while the third DC/DC synchronous rectifier converter 230 is processing power in the reverse direction. As previously mentioned, with one or more converters operating in this reverse power processing mode, the overall power system could be circulating large amounts of current while delivering very little current to the load. This results in a high power dissipation during lighter load conditions.

Figure 3:
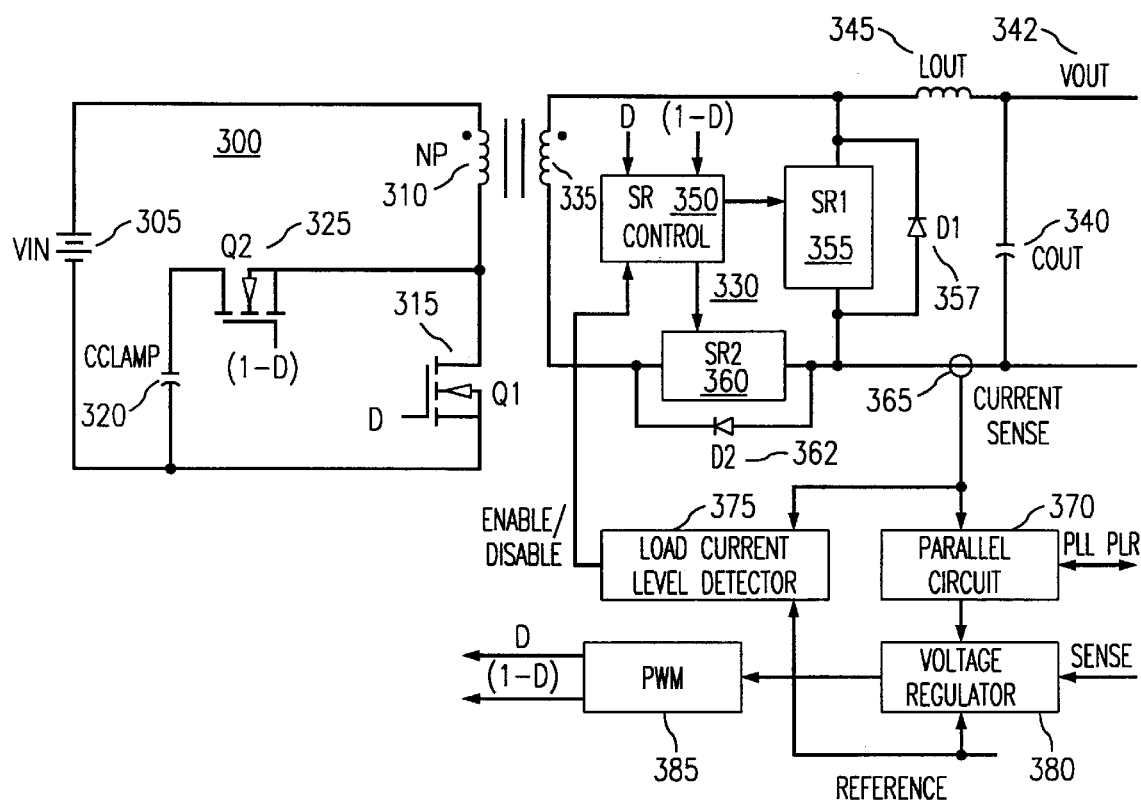
FIG. 3 illustrates a schematic diagram of a clamped-mode forward converter circuit with a synchronous rectifier circuit employing the principles of the present invention.

Turning now to FIG. 3, illustrated is a schematic diagram of a clamped-mode forward converter circuit 300 with a synchronous rectifier circuit 330 employing the principles of the present invention. The clamped-mode forward converter circuit 300 and its advantages are discussed in U.S. Pat. No. 5,303,138 to Rozman, issued on Apr. 12, 1994, entitled "Low Loss Synchronous Rectifier for Application to Clamped-Mode Power Converters" and incorporated herein by reference. The clamped-mode forward converter circuit 300 comprises a voltage input $V_{in}$ 305 connected to a primary winding 310 of a power transformer by a MOSFET power switch Q1 315. The power switch 315 is shunted by series connection of a clamp capacitor 320 and a MOSFET switch device Q2 325. The conducting intervals of the power switch 315 and the switch device 325 are mutually exclusive. The duty cycle of the power switch 315 is D and the duty cycle of the switch device 325 is 1–D.

A secondary winding 335 of the power transformer is connected to an output capacitance load $C^{out}$ ut 340 through an output filter inductor $L_{out}$ 345 and the synchronous rectifier circuit 330, providing a substantially alternating current input to the synchronous rectifier circuit 330. The synchronous rectifier circuit 330 comprises control circuitry 350 and switching circuitry. A synchronous rectifier device SR1 355 and a synchronous rectifier device SR2 360 comprise the switching circuitry. The switching circuitry may be realized with any suitable rectifier devices, although a low $R_{DS(on)}$ N-channel MOSFET is suitable for such applications. A diode D1 357 and a diode D2 362 are discrete devices placed in parallel with SR1 355 and SR2 360, respectively. However, D1 357 and D2 362 may represent an integral body diode of a N-channel MOSFET.

The synchronous rectifier control circuit 350 may be either a control driven circuit, or a self-synchronized drive circuit. Additionally, the overall power train topology encompasses any topology suitable for synchronous rectification, and is not limited to the topology shown in the illustrated embodiment.

The present invention also comprises a current sensing device 365 capable of sensing a converter output level. The current sensing device 365 encompasses a current transformer connected in series with Q1 315, a shunt resistor in series with the output, or a Hall effect current sense device in series with the output. The sensed current signal is then provided to the parallel control circuitry 370 to facilitate forced load-sharing.

The current signal is also provided to a level detector 375 which compares the load current to some predetermined reference level. When the converter is operating below some fraction of full rated load current, perhaps 5% or 10%, the detector 375 will disable the synchronous rectifier drive circuit 330. This action reconfigures the converter from a synchronous rectifier circuit to a conventional diode rectifier circuit. Since a diode rectifier circuit cannot process power in the reverse direction, the proposed circuit effectively prevents reverse power flow. When the converter output current increases beyond the 5% or 10% trip level (some hysteresis is probably preferred), the synchronous rectifier drive circuit 330 is enabled, resuming normal operation. Thus, the control circuit 350 transitions the switching circuitry SR1 355 and/or SR2 360 from the active bidirectional mode to the inactive unidirectional mode when the output current level drops below a predetermined threshold level.

Note that the circuit retains the efficiency benefits of synchronous rectification at higher loads, where efficiency is most important. Reconfiguring the circuit to diode rectification at light loads prevents reverse power flow, but should not significantly impact light load efficiency. In fact, light load efficiency may be improved with diode rectification, as the overhead of the MOSFET gate drive loss is eliminated.

The remaining circuitry is standard for synchronous rectifier circuits configured for parallel operation. A voltage regulator 380 monitors the load and restores the output voltage $V_{out}$ 342 to within tolerance limits despite changes in both the load and the input voltage $V_{in}$ 305. A pulse-width modulation ("PWM") circuit 385 is included to keep the output voltage $V_{out}$ 342 of the converter constant over the various operating conditions. Finally, the circuits are coupled as illustrated by the interconnecting lines and arrows, and the synchronous rectifier control circuitry 350 and the PWM circuit 385 are coupled to the clamped-mode circuit 300 at Q1 315 and Q2 325 as illustrated.

Even though the illustrated embodiment is designed to accommodate parallel operation, in certain applications the converter could be used in a stand alone configuration. In such applications it would be desirable to retain the benefits of reverse power flow afforded by synchronous rectification, such as the elimination of critical current problems. The load current level detector circuit 375 may be disabled during non-paralleled, or stand alone, operation. An additional circuit may then be incorporated into the design that senses parallel operation (e.g. ground the parallel pin when not in use) and disable the load current level detector circuit 375 during non-parallel operation.

Figure 4:
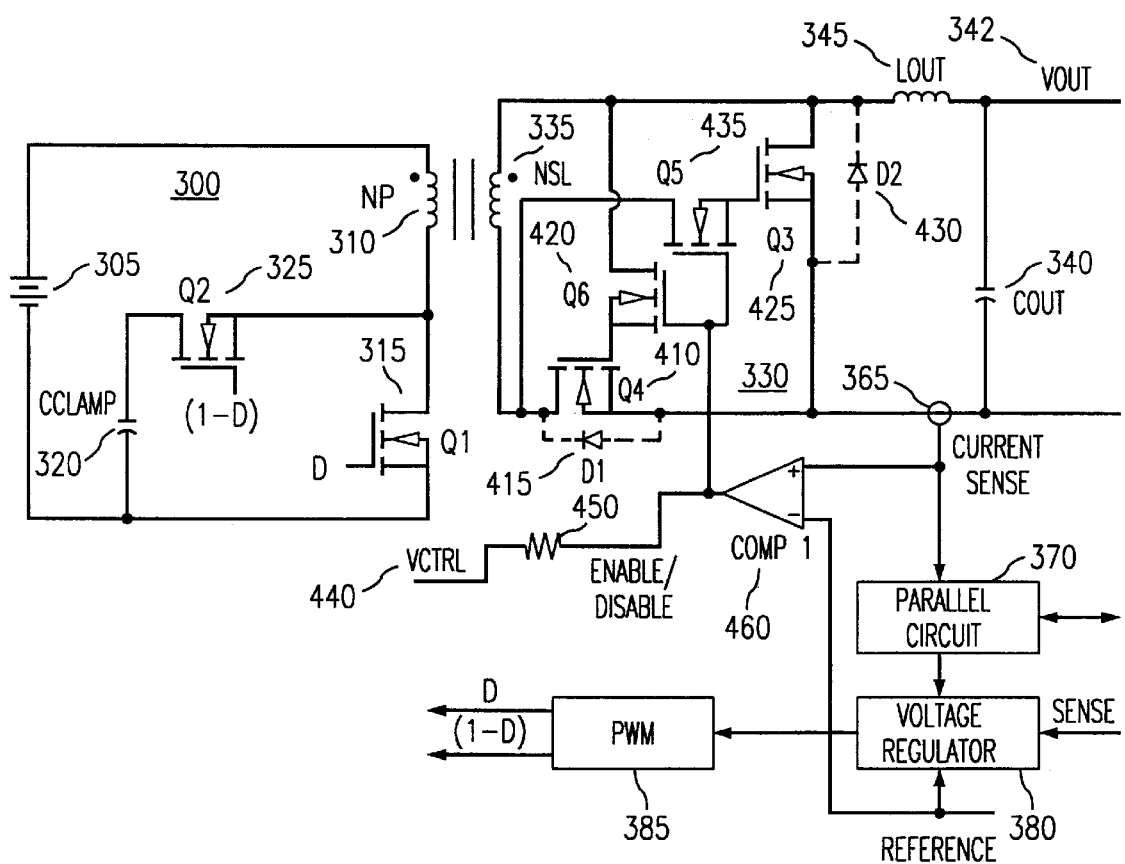
FIG. 4 illustrates a schematic diagram of a second embodiment of the clamped-mode forward converter circuit with the synchronous rectifier circuit of FIG. 3 employing the principles of the present invention.

Turning now to FIG. 4, illustrated is a schematic diagram of a second embodiment of the clamped-mode forward converter circuit 300 with the synchronous rectifier circuit 330 of FIG. 3 employing the principles of the present invention. As discussed with respect to FIG. 3, the clamped-mode forward converter circuit 300 is connected to the power transformer that is connected to the output capacitance load $C_{out}$ 340 through the output filter inductor $L_{out}$ 345 and the synchronous rectifier circuit 330. Again, the synchronous rectifier circuit 330 comprises the switching circuitry and the control circuitry.

In this illustrated embodiment, the switching circuitry comprises a MOSFET rectifying device Q4 410 in parallel with a diode D1 415, and the gate of Q4 410 is coupled to a gate voltage clamping MOSFET Q6 420. The switching circuitry further comprises a MOSFET rectifying device Q3 425 in parallel with a diode D2 430, and the gate of Q3 425 is coupled to a gate voltage clamping MOSFET Q5 435. The gate voltage clamping MOSFETs and their advantages are discussed in Loftus. The synchronous rectifier circuit of FIG. 4 employs a self synchronized drive circuit.

An enabling level voltage $V_{ctrl}$ 440 is applied through a resistor 450 to control the proper operating voltage levels for the MOSFET rectifying devices 410, 425 and their respective drive MOSFETs 420, 435. Gate drive energy for the rectifying devices is obtained from the power train during turn on transition and returned to the power train during turn off transition.

With continuing reference to FIGS. 3 and 4, the control circuitry of the synchronous rectifier circuit 330 comprises a comparator 460. A current sensed output level from the current sensing device 365 is provided to a non-inverting input of the comparator 460 and a reference signal is provided to the inverting input of the comparator 460. The comparator 460 then compares the load current to the predetermined reference level. When the converter is operating below some fraction of full rated load current, perhaps 5% or 10%, the comparator 460 sends a signal to disable the synchronous rectifier drive circuit 330. This action reconfigures the converter from a synchronous rectifier circuit to a conventional diode rectifier circuit. When the converter output current increases beyond the 5% or 10% trip level (some hysteresis is probably preferred), the synchronous rectifier drive circuit 330 is enabled, resuming normal operation. Thus, the control circuit 460 transitions the switching circuitry Q3 425 and/or Q4 410 from the active bidirectional mode to the inactive unidirectional mode when the output current level drops below a predetermined threshold level. Therefore, the principles of the present invention are incorporated into the circuit of the illustrated embodiment.

Finally, the remainder of the components in the circuit with their corresponding functions are described with respect to FIG. 4.

The proposed circuit may be necessary during "hot plug-in" of paralleled power converters. During "hot plug-in," the output of a power converter may be energized before the converter initiates switching action. In this event, the MOSFETs of a self-synchronized circuit may turn on, as the gates are energized by the voltage on the output. Such a condition could lead to a catastrophic failure at "hot plug-in." With the proposed circuit, the synchronous MOSFETs will remain disabled until the converter starts and begins supplying output current. This possible catastrophic failure mode of self synchronized converters is therefore eliminated.

Figure 5:
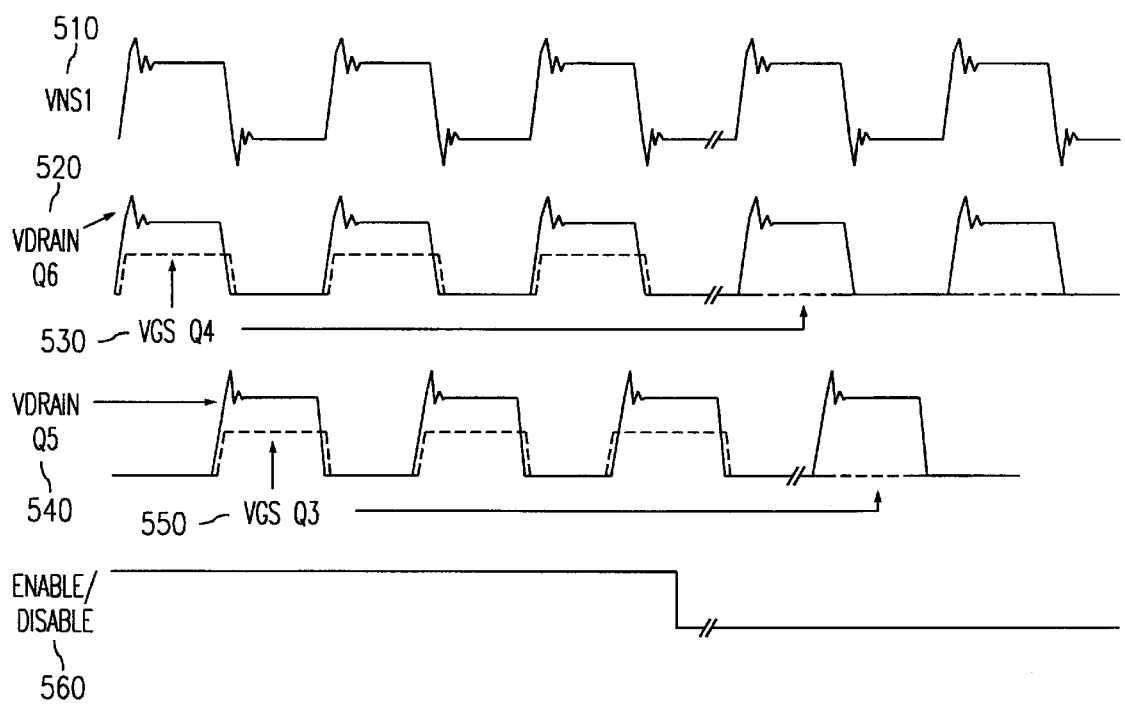
FIG. 5 illustrates a timing diagram of the operation of the circuit of FIG. 4.
Figure 1:
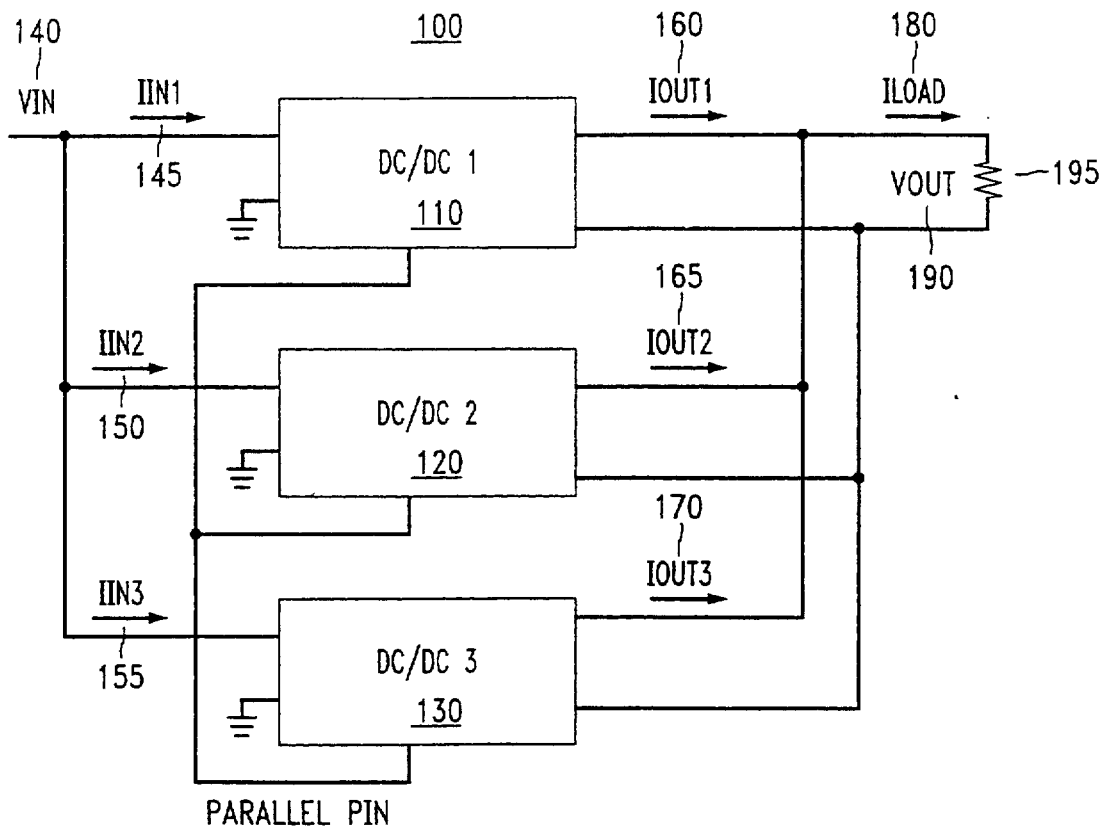
Figure 2:
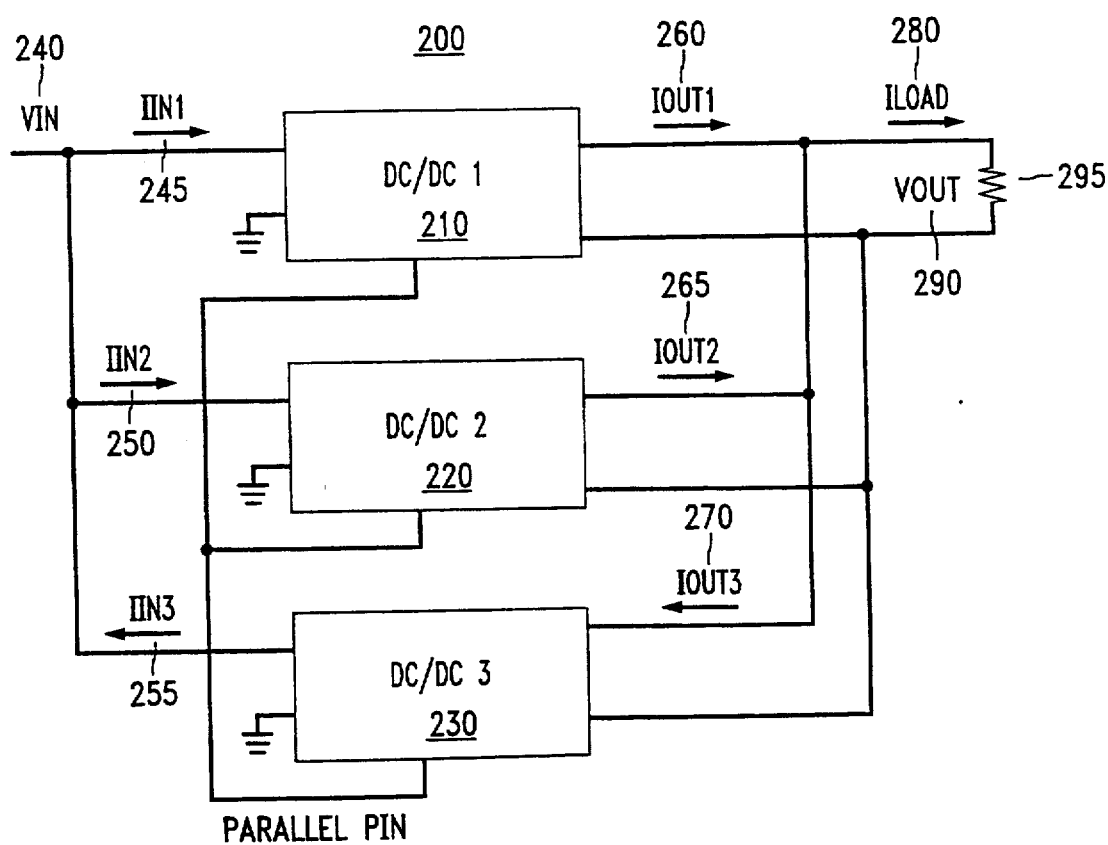
Figure 3:
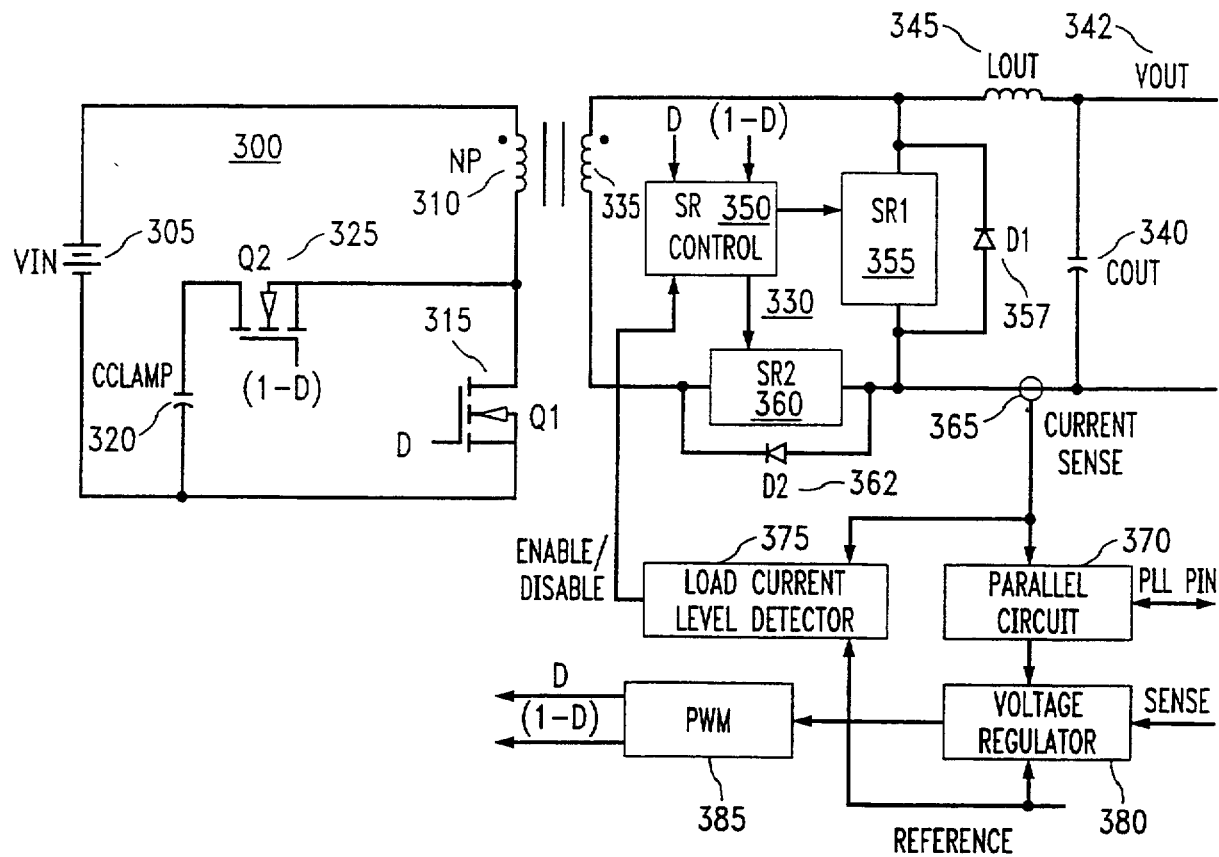

Turning now to FIG. 5, illustrated is a timing diagram of the operation of the circuit of FIG. 4. The voltage waveforms represent the voltage of the following devices. $V_{ns1}$ 510 represents the voltage at the secondary winding of the power transformer. $V_{drain\ Q6}$ 520 represents the drain voltage of Q6 420, and $V_{gs\ Q4}$ 530 represents the gate-to-source voltage of Q4 410. Comparably, $V_{drain\ Q5}$ 540 represents the drain voltage of Q5 435, and $V_{gs\ Q3}$ 550 represents the gate-to-source voltage of Q3 425. Finally, the enable/disable signal 560 represents an enabling and disabling signal to the synchronous rectifier circuit 330.

In view of the timing diagram, the circuit of FIG. 4 operates as follows. Assume that the converter is operating at full load and that the comparator 460 (an open collector device) output is high impedance. The voltage $V_{ctrl}$ 440 (set at 10 V to 12 V) is a DC voltage applied to the gates of Q5 435 and Q6 420 through the resistor 450. Assume also that the converter is operating in the part of the switching cycle where Q1 315 and Q4 410 are on, and Q2 325 and Q3 425 are off. Given these initial conditions, the voltage applied to the gate of Q4 410 is clamped by Q6 420 to a threshold voltage drop (about 2 V to 3 V) below $V_{ctrl}$ 440. Q6 420 therefore clamps the maximum voltage applied to the gate of Q4 410, and prevents this voltage from exceeding the maximum device ratings, as shown in the $V_{gs\_Q4}$ 530 waveform. At the end of the cycle, Q1 315 turns off and Q2 325 turns on, reversing the voltage $V_{ns1}$ 510 across the second winding 335. As the voltage across the secondary winding collapses and eventually reverses, the gate of Q4 410 will be discharged through the body diode of Q6 (not shown), turning off Q4 410. Q3 425 is turned on as its gate is charged through Q5 435, and the $V_{gs\_Q3}$ 550 continues to rise until it reaches one threshold drop below $V_{ctrl}$ 440. As Q1 315 turns on and Q2 325 turns off, the cycle repeats.

Note that the gate clamping MOSFETs, QS 435 and Q6 420, act to limit the maximum voltage applied to the gate of the synchronous rectifier MOSFETs, Q3 425 and Q4 410, respectively. This clamping action can expand the useful input voltage range of the converter, and can also allow the use of logic level MOSFETs. In addition, Q5 435 and Q6 420 may be used as switches to disable the flow of channel current through Q3 425 and Q4 410. By using the comparator 460 to ground the gates of Q5 435 and/or Q6 420, the synchronous MOSFETs (Q3 425 and/or Q4 410) can be disabled, thus reconfiguring the power train from synchronous rectification to diode rectification.

As previously mentioned, at higher load levels, the voltage on the non-inverting pin of the comparator 460 (the current sense signal) has a larger magnitude than the referencing voltage, which is applied to the inverting terminal of the comparator. In this condition, the output of the comparator 460 is configured for high impedance, allowing $V_{ctrl}$ 440 to be applied to the gates of Q5 435 and Q6 420, resulting in normal synchronous rectifier operation. As the load is reduced, the current sense voltage reduces linearly. At a light enough load (about 5% or 10% full load) the current sense voltage will fall below the reference, and the output of the comparator 460 pulls the gates of Q5 435 and/or Q6 420 to ground, thus disabling Q3 425 and/or Q4 410, respectively. The process then reverses as the load is increased.

Although the present invention has been described in detail, those skilled in the art should understand that they can make various changes, substitutions and alterations herein without departing from the spirit and scope of the invention in its broadest form.

What is claimed is:

1. A power supply, comprising:
    control driven switching circuitry including at least one synchronous rectifier device and adapted to operate in a selected one of (a) an active bi-directional mode of operation when enabled and (b) an inactive unidirectional mode of operation when disabled, said control driven switching circuitry thereby rectifying substantially alternating current to produce substantially direct current;
    a sensor capable of sensing an output level of said power supply;
    a level detector capable of comparing said output level with a threshold level and developing a control signal in accordance therewith; and
    synchronous rectifier control circuitry, coupled to said level detector, adapted to energize said control driven switching circuitry and employ said control signal to disable said control driven switching circuitry as a function of said output level to thereby prevent substantial reverse power flow through said power supply.

2. The power supply as recited in claim 1, further comprising:
    a power transformer having primary and secondary windings, said secondary winding being coupled said control driven switching circuitry; and
    at least one power switch occasionally coupling said primary winding to a source of electrical power.

3. The power supply as recited in claim 2 further comprising a clamping circuit, coupled to said power transformer, adapted to limit a voltage across said power transformer during at least a portion of a non-conduction interval of said at least one power switch.

4. The power supply as recited in claim 1 wherein said control driven switching circuitry comprises metal oxide semiconductor field effect transistor (MOSFET) switches.

5. The power supply as recited in claim 1 wherein said power supply is parallel-coupled to a second power supply, said synchronous rectifier control circuitry adapted to disable said control driven switching circuitry thereby preventing said second power supply from causing said substantial reverse power flow.

6. The power supply as recited in claim 5 further comprising an active load-sharing circuit that effects load sharing between said power supply and said second power supply.

7. The power supply as recited in claim 1 wherein said control driven switching circuitry comprises discrete diodes to allow said control driven switching circuitry to operate in said inactive unidirectional mode of operation.

8. The power supply as recited in claim 1 wherein said sensor is selected from the group consisting of:
    a current transformer in electrical communication with an output of said power supply;
    a resistor in electrical communication with said output; and
    a Hall effect current sense device coupled in series with said output.

9. The power supply as recited in claim 1 wherein said control driven switching circuitry comprises a plurality of synchronous rectifier devices, said synchronous rectifier control circuitry adapted to disable all of said plurality of synchronous rectifier devices.

10. The power supply as recited in claim 1 further comprising detection circuitry capable of detecting parallel operation between said power supply and a second power supply, said detection circuitry allowing said synchronous rectifier control circuitry to disable said control driven switching circuitry only when said power supply is parallel-coupled to said second power supply.

11. The power supply as recited in claim 1 wherein said synchronous rectifier control circuitry disables said control driven switching circuitry when said output level drops below said threshold level.

12. The power supply as recited in claim 1 wherein said synchronous rectifier control circuitry disables said control driven switching circuitry when said output level is between about 5% and 10% of a full rated output level.

13. A method for controlling a synchronousrectifiercircuit in a power supply, comprising:
    providing control driven switching circuitry including at least one synchronous rectifier device and adapted to operate in a selected one of (a) an active bi-directional mode of operation when enabled and (b) an inactive unidirectional mode of operation when disabled, said control driven switching circuitry thereby rectifying substantially alternating current to produce substantially direct current;

sensing an output level of said power supply;

comparing said output level with a threshold level and developing a control signal in accordance therewith; and coupling synchronous rectifier control circuitry to said level detector, said control circuit being adapted to energize said control driven switching circuitry and employ said control signal to disable said control driven switching circuitry as a function of said output level to thereby prevent substantial reverse power flow through said power supply.

14. The method as recited in claim 13, further comprising:

providing a power transformer having primary and secondary windings;

occasionally coupling said primary winding to a source of electrical power with at least one power switch;

coupling said control driven switching circuitry to said secondary winding; and limiting a voltage across said power transformer during at least a portion of a non-conduction interval of said at least one power switch.

15. The method as recited in claim 13, further comprising:

parallel-coupling said power supply to a second power supply;

allowing said synchronous rectifier control circuitry to disable said control driven switching circuitry thereby preventing said second power supply from causing said substantial reverse power flow; and effecting load sharing between said power supply and said second power supply.

16. The method as recited in claim 13 wherein said control driven switching circuitry comprises discrete diodes to allow said control driven switching circuitry to operate in said inactive unidirectional mode of operation.

17. The method as recited in claim 13 wherein said control driven switching circuitry comprises a plurality of synchronous rectifier devices, said synchronous rectifier control circuitry adapted to disable all of said plurality of synchronous rectifier devices.

18. The method as recited in claim 13 further comprising detecting parallel operation between said power supply and a second power supply, said synchronous rectifier control circuitry adapted to disable said control driven switching circuitry only when said power supply is parallel-coupled to said second power supply.

19. The method as recited in claim 13 wherein said synchronous rectifier control circuitry disables said control driven switching circuitry when said output level drops below said threshold level.

20. A power supply, comprising:

a power transformer having primary and secondary windings;

at least one power switch occasionally coupling said primary winding to a source of electrical power;

self-synchronized switching circuitry including at least one synchronous rectifier device coupled to said secondary winding and adapted to operate in a selected one of (a) an active bidirectional mode of operation when enabled and (b) an inactive unidirectional mode of operation when disabled, said self-synchronized switching circuitry thereby rectifying substantially alternating current to produce substantially direct current;

a sensor capable of sensing an output level of said power supply;

a level detector capable of comparing said output level with a threshold level and developing a control signal in accordance therewith;

synchronous rectifier control circuitry coupled to said power transformer and adapted to energize said self-synchronized switching circuitry therefrom; and an enabling voltage source adapted to energize said synchronous rectifier control circuitry, said synchronous rectifier control circuitry capable of employing said control signal to disable said self-synchronized switching circuitry as a function of said output level to thereby prevent substantial reverse power flow through said power supply.

21. The power supply as recited in claim 20 further comprising a clamping circuit, coupled to said power transformer, adapted to limit a voltage across said power transformer during at least a portion of a non-conduction interval of said at least one power switch.

22. The power supply as recited in claim 20 wherein said self-synchronized switching circuitry comprises metal oxide semiconductor field effect transistor (MOSFET) switches.

23. The power supply as recited in claim 20 wherein said power supply is parallel-coupled to a second power supply, said synchronous rectifier control circuitry adapted to disable said self-synchronized switching circuitry thereby preventing said second power supply from causing said substantial reverse power flow.

24. The power supply as recited in claim 23 further comprising an active load-sharing circuit that effects load sharing between said power supply and said second power supply.

25. The power supply as recited in claim 20 wherein said self-synchronized switching circuitry comprises discrete diodes to allow said self-synchronized switching circuitry to operate in said inactive unidirectional mode of operation.

26. The power supply as recited in claim 20 wherein said sensor is selected from the group consisting of:

a current transformer in electrical communication with an output of said power supply;

a resistor in electrical communication with said output; and a Hall effect current sense device coupled in series with said output.

27. The power supply as recited in claim 20 wherein said self-synchronized switching circuitry comprises a plurality of synchronous rectifier devices, said synchronous rectifier control circuitry adapted to disable all of said plurality of synchronous rectifier devices.

28. The power supply as recited in claim 20 further comprising detection circuitry capable of detecting parallel operation between said power supply and a second power supply, said detection circuitry allowing said synchronous rectifier control circuitry to disable said self-synchronized switching circuitry only when said power supply is parallel-coupled to said second power supply.

29. The power supply as recited in claim 20 wherein said synchronous rectifier control circuitry disables said self-synchronized switching circuitry when said output level drops below said threshold level.

30. The power supply as recited in claim 20 wherein said synchronous rectifier control circuitry disables said self-synchronized switching circuitry when said output level is between about 5% and 10% of a full rated output level.

31. The power supply as recited in claim 20 wherein said synchronous rectifier control circuitry comprises at least one gate voltage clamping device.

32. A method for controlling a synchronous rectifier circuit in a power supply, comprising:

providing a power transformer having primary and secondary windings;

occasionally coupling said primary winding to a source of electrical power with at least one power switch;

coupling self-synchronized switching circuitry including at least one synchronous rectifier device to said secondary winding, said self-synchronized switching circuitry adapted to operate in a selected one of (a) an active bi-directional mode of operation when enabled and (b) an inactive unidirectional mode of operation when disabled, said self-synchronized switching circuitry thereby rectifying substantially alternating current to produce substantially direct current;

sensing an output level of said power supply;

comparing said output level with a threshold level and developing a control signal in accordance therewith;

coupling synchronous rectifier control circuitry to said power transformer and energizing said self-synchronized switching circuitry therefrom; and energizing said synchronous rectifier control circuitry with an enabling voltage source, said synchronous rectifier control circuitry capable of employing said control signal to disable said self-synchronized switching circuitry as a function of said output level to thereby prevent substantial reverse power flow through said power supply.

33. The method as recited in claim 32 further comprising limiting a voltage across said power transformer during at least a portion of a non-conduction interval of said at least one power switch.

34. The method as recited in claim 32, further comprising:

parallel-coupling said power supply to a second power supply;

allowing said synchronous rectifier control circuitry to disable said self-synchronized switching circuitry thereby preventing said second power supply from causing said substantial reverse power flow; and effecting load sharing between said power supply and said second power supply.

35. The method as recited in claim 32 wherein said self-synchronized switching circuitry comprises discrete diodes to allow said self-synchronized switching circuitry to operate in said inactive unidirectional mode of operation.

36. The method as recited in claim 32 wherein said self-synchronized switching circuitry comprises a plurality of synchronous rectifier devices, said synchronous rectifier control circuitry adapted to disable all of said plurality of synchronous rectifier devices.

37. The method as recited in claim 32 further comprising detecting parallel operation between said power supply and a second power supply, said synchronous rectifier control circuitry adapted to disable said self-synchronized switching circuitry only when said power supply is parallel-coupled to said second power supply.

38. The method as recited in claim 32 wherein said synchronous rectifier control circuitry disables said self-synchronized switching circuitry when said output level drops below said threshold level.

39. The method as recited in claim 32 wherein said synchronous rectifier control circuitry comprises at least one gate voltage clamping device.

40. A power system having first and second power supplies, each of said first and second power supplies, comprising;

switching circuitry including at least one synchronous rectifier device and adapted to operate in a selected one of (a) an active bi-directional mode of operation when enabled and (b) an inactive unidirectional mode of operation when disabled, said switching circuitry thereby rectifying substantially alternating current to produce substantially direct current in a normal periodic mode of operation;

synchronous rectifier control circuitry coupled to said switching and adapted to energize and de-energize said switching circuitry;

a sensor capable of sensing an output level thereof;

a level detector capable of comparing said output level with a threshold level and developing a control signal in accordance therewith;

an active load sharing circuit capable of effecting load sharing between said first and second power supplies within a specified operating range, said synchronous rectifier control circuitry adapted to employ said control signal to disable said switching circuitry as a function of said output level to thereby prevent substantial reverse power flow through one of said first and second power supplies when said active load sharing circuit is operating outside of said specified operating range.

41. The power system as recited in claim 40 wherein said active load sharing circuit operates outside of said specified operating range during start-up of said first or second power supplies.

42. The power system as recited in claim 40 wherein said active load sharing circuit operates outside of said specified operating range during hot plug-in of said first or second power supplies.

43. The power system as recited in claim 40 wherein said active load sharing circuit operates outside of said specified operating range during shut-down of said first or second power supplies.

44. The power system as recited in claim 40 wherein each of said first and second power supplies, further comprise:

a power transformer having primary and secondary windings, said secondary winding being coupled said switching circuitry;

at least one power switch occasionally coupling said primary winding to a source of electrical power; and a clamping circuit, coupled to said power transformer, adapted to limit a voltage across said power transformer during at least a portion of a non-conduction interval of said at least one power switch.

45. The power system as recited in claim 40 wherein each of said first and second power supplies comprise discrete diodes to allow said switching circuitry to operate in said inactive unidirectional mode of operation.

46. The power system as recited in claim 40 wherein said sensor is selected from the group consisting of:

a current transformer in electrical communication with an output of said power supply;

a resistor in electrical communication with said output; and a Hall effect current sense device coupled in series with said output.

47. The power system as recited in claim 40 wherein said switching circuitry comprises a plurality of synchronous rectifier devices, said synchronous rectifier control circuitry adapted to disable all of said plurality of synchronous rectifier devices.

48. The power system as recited in claim 40 wherein said synchronous rectifier control circuitry disables said switching circuitry when said output level drops below said threshold level.

49. The power system as recited in claim 40 wherein said synchronous rectifier control circuitry comprises at least one gate voltage clamping device.

* * * * *

UNITED STATES PATENT AND TRADEMARK OFFICE
CERTIFICATE OF CORRECTION

PATENT NO. : 5,956,245
DATED : September 21, 1999
INVENTOR(S) : Allen Frank Rozman It is certified that error appears in the above-identified patent and that said Letters Patent is hereby corrected as shown below:

Replace Figure 1, Figure 2 and Figure 3 with the corrected Figure 1, Figure 2 and Figure 3, attached hereto.

Col. 1, line 52, delete "transistor" and insert --transistors--.

Col. 4, line 14, following "current", insert --flow--.

Col. 4, line 27, delete ".".

Col. 6, line 12, delete "$L_{out}$:" and insert --$I_{out1}$--.

Col. 6, line 15, following "$I_{out3}$", delete ";".

Col. 6, line 47, delete "$C^{out}$ ut" and insert --$C_{out}$--.

Col. 8, line 40, delete "4" and insert --3--.

Col. 9, line 20, delete "QS", insert --Q5--.

Col. 9, line 36, following "comparator", insert --460--.

Col. 10, line 8, following "coupled", insert --to--.

Col. 11, line 10, delete "coupling" and insert --providing--.

Col. 11, lines 10-11, delete "to said level detector, said control circuit being".

UNITED STATES PATENT AND TRADEMARK OFFICE
CERTIFICATE OF CORRECTION

PATENT NO. : 5,956,245
DATED : September 21, 1999
INVENTOR(S) : Allen Frank Rozman It is certified that error appears in the above-identified patent and that said Letters Patent is hereby corrected as shown below:

Col. 14, line 16, following "switching", insert --circuitry--.

Col. 14, line 45, delete "comprise" and insert --comprises--.

Col. 14, line 47, following "coupled", insert --to--.

Signed and Sealed this

Seventeenth Day of April, 2001

Attest:

NICHOLAS P. GODICI

Attesting Officer

Acting Director of the United States Patent and Trademark Office